United States Patent [19]

Ishihara et al.

[11] Patent Number: 5,252,404
[45] Date of Patent: Oct. 12, 1993

[54] POLYESTER COATING COMPOSITIONS AND PRECOATED STEEL SHEET USING SAME

[75] Inventors: Ryoji Ishihara, Tanabe; Haruhiko Sawada, Neyagawa; Koichi Kimura, Osaka, all of Japan

[73] Assignee: Nippon Paint Co., Ltd., Osaka, Japan

[21] Appl. No.: 838,659

[22] Filed: Feb. 21, 1992

[30] Foreign Application Priority Data

Feb. 22, 1991 [JP] Japan .................. 3-050560
Feb. 22, 1991 [JP] Japan .................. 3-050561

[51] Int. Cl.$^5$ .................. C08G 18/80; C08G 18/42; C08G 65/28
[52] U.S. Cl. .................. 428/458; 525/440; 525/441; 528/45; 528/80; 528/99
[58] Field of Search .................. 528/87, 99, 107, 112, 528/45, 80; 525/440, 441; 428/458

[56] References Cited

U.S. PATENT DOCUMENTS 4,904,706  2/1990  Uenishi et al. .................. 521/164

FOREIGN PATENT DOCUMENTS 64-33168  2/1989  Japan .
1-95165  4/1989  Japan .
1-110528  4/1989  Japan .

Primary Examiner—James J. Seidleck
Assistant Examiner—Thomas Hamilton, III
Attorney, Agent, or Firm—Millen, White, Zelano, & Branigan

[57] ABSTRACT

A polyester coating composition comprising:

(A) 50 to 95 parts by weight as solids of a polyester resin produced by reacting a polybasic acid component containing 0 to 85 mole % of the total acid component of an aromatic dicarboxylic acid, and a polyhydric alcohol component containing 20 to 100 mole % of the total alcohol component of a bisphenol S-alkylene oxide adduct of the formula:

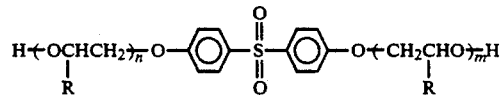

wherein R is H or methyl, n and m are each an integer from 1 to 8, and 0 to 30 mole % of the total alcohol component of a branched chain-aliphatic glycol; and (B) 50 to 5 parts by weight as solids of an aminoplast resin and/or a blocked polyisocyanate.

19 Claims, No Drawings

POLYESTER COATING COMPOSITIONS AND PRECOATED STEEL SHEET USING SAME

BACKGROUND OF THE INVENTION

This invention relates to a polyester coating composition and steel sheets precoated with the same.

Polyester coating compositions containing a polyester polymer and a crosslinker such as melamine resins or blocked polyisocyanates have been widely used in precoated sheet metals, automobiles and other industrial applications. For use in precoated sheet metals for indoor and outdoor uses as parts of household electrical appliances, building construction and the like in particular, the coating compositions must give a finish which is excellent not only in hardness and machinability but also in blot-proofness and luster. Heretofore, these properties have been controlled by suitably selecting the glass transition temperature (Tg), molecular weight (MW), monomer proportions, functionality and other parameters of polyester resins. However, none of prior art attempts have succeeded in providing a coating composition which satisfies with all of the above requirements, namely excellent hardness and machinability at low temperatures in particular as well as blot-proofness and luster.

It is, therefore, an object of the present invention to provide a polyester coating composition for use in precoated sheet metals, automobiles and other industrial applications which is excellent not only in hardness and machinability but also in blot-proofness luster and/or anti-press impression and anti-chemical properties.

It is another object of the present invention to provide a precoated steel sheets having a coating of the above composition.

SUMMARY OF THE INVENTION

According to one aspect of the present invention, there is provided a polyester coating composition comprising:

(A) 50 to 95 parts by weight as solids of a polyester resin produced by reacting a polybasic acid component containing 0 to 85 mole % of the total acid component of an aromatic dicarboxylic acid, and a polyhydric alcohol component containing 20 to 100 mole % of the total alcohol component of a bisphenol S-alkylene oxide adduct of the formula:

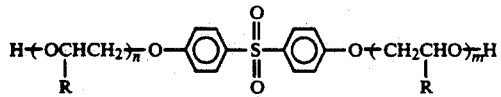

wherein R is H or methyl, n and m are each an integer from 1 to 8, and 0 to 30 mole % of the total alcohol component of a branched chain-aliphatic glycol; and (B) 50 to 5 parts by weight as solids of an aminoplast resin and/or a blocked polyisocyanate.

In another aspect of the present invention, there is provided a precoated steel sheet having a coating thereon formed by applying and baking the above coating composition.

DETAILED DISCUSSION

As is well-known in the art, polyester resins are a polycondensate of a polybasic acid component and polyhydric alcohol component.

Examples of polybasic acids includes aromatic dicarboxylic acids and anhydrides such as terephthalic acid, isophthalic acid, phthalic acid and its anhydride, 2,6-naphthalenedicarboxylic acid, 2,7-naphthalenedicarboxylic acid and the like. Aliphatic dicarboxylic acids such as succinic acid, adipic acid, azelaic acid, sebacic acid, dodecanedicarboxylic acid and 1,4-cyclohexanedicarboxylic acid may also be used. A small proportion of lactones such as γ-butyrolactone, and ε-caprolactone, hydroxycarboxylic acids corresponding to these lactones, aromatic hydroxycarboxylic acid such as p-hydroxybenzoic acid and p-hydroxyethoxybenzoic acid, and tri- or tetracarboxylic acids such as trimellitic acid, trimesic acid and pyromellitic acid may be incorporated to the acid component.

According to the present invention, the proportion of the first mentioned aromatic dicarboxylic acids in the total acid component should not be greater than 85 mole %. In other words, 15 to 100 mole % of the total acid component is occupied by other polybasic carboxylic acids. Advantageously, the acid component consists of 70 to 85 mole % of terephthalic acid and/or isophthalic acid and the balance of polybasic carboxylic acids other than aromatic dicarboxylic acids. This results in a coating film having excellent anti-press impression and anti-chemical properties. Excessive proportions of aromatic dicarboxylic acid in the total acid component will decrease the flexibity of films coated on sheet metals.

The alcohol component used in the synthesis of polyester resins of this invention consists of 20 to 100 moles %, preferably 40 to 90 mole % of a bisphenol S-alkylene oxide adduct as defined above. Examples of other polyhydric alcohols which may optionally be used include branched chain-aliphatic glycols such as 1,2-propanediol, neopentyl glycol, 1,2-butanediol, 1,3-butanediol, 2,3-butanediol, 1,2-pentanediol, 1,4-pentanediol, 1,4-hexanediol, 2,5-hexanediol, 3-methyl-1,5-pentanediol, 1,2-dodecanediol and 1,2-octadecanediol, and other diols such as ethylene glycol, 1,3-propanediol, 1,4-butanediol, 1,5-pentanediol, 1,6-hexanediol, diethylene glycol, triethylene glycol, 1,4-cycloxanediol, 1,6-hexanediol, 1,4-cyclohexanedimethanol and bisphenol A-alkylene oxide adducts. A small proportion of tri- or tetrahydric alcohols such as trimethylolethane, trimethylolpropane, glycerine and pentaerythritol may be incorporated to the alcohol component. The proportion of branched chain-aliphatic glycols in the total alcohol component should not exceed 30 mole %. Smaller proportions of bisphenol S-alkylene oxide adducts and excessive proportions of branched chain-aliphatic glycols both adversely affect the flexibility, blot-proofness, anti-press impression and anti-chemical properties of cured films formed on precoated sheet metals.

Using the above-mentioned polybasic acid component and polyhydric alcohol component, a conventional polycondensation reaction may be carried out as is well-known in the art. The resulting polyester should have a molecular weight of at least 500, preferably from 2,000 to 25,000.

Aminoplast resins are produced, as is well-known, by reacting an amino component such as melamine, urea, acetoguanamine, benzoguanamine, stearoguanamine and spiroguanamine with an aldehyde such as formaldehyde, paraformaldehyde, acetaldehyde and glyoxal. The products may be etherified with a lower alkanol such as methanol and butanol. Melamine-formaldehyde condensates and their etherified products may preferably used in the present invention.

Blocked polyisocyanates are produced, as is well-known, by blocking the free isocyanate function of an organic polyisocyanate such as tolylenediisocyanate, xylylenediisocyanate, polymethylenepolyphenylenepolyisocyanate, hexamethylenediisocyanate and isophoronediisocyanate with a blocking agent. Blocked polyisocyanates of a non-yellowing polyisocyanate such as hexamethylenediisocyanate and isophronediisocyanate are preferably used. Commercial products are available such as Coronate 2515 from Nippon Polyurethane Co., Ltd., Takenate R-815M from Takeda Chemical Industries Ltd., Vernoc D-550 from Dainippon Ink And Chemicals, Inc., Aditol UXL-80 from Hoechst AG, and the like.

The coating composition of this invention comprises above-mentioned polyester resin and aminoplast and/or blocked polyisocyanate crosslinker at a weight ratio as solids of 95-50:5-50, preferably 90-60:10-40. Within this range, the resulting films may exhibit satisfactory performance.

The coating composition of this invention may generally used as a solution in an organic solvent which may be selected, depending upon its solubility and evaporation rate, from, for example, toluene, xylene, Solvesso 100, Solvesso 150, ethyl acetate, butyl acetate, methyl ethyl ketone, methyl isobutyl ketone, cyclohexanone, isophorone, butanol, octanol, diacetone alcohol, carbitol acetate, methoxybutyl acetate or a mixture thereof.

The coating composition of this invention may contain, of course, a coloring pigment such as titanium dioxide, a body pigment and other conventional additives depending upon its use or applications. For example, systems containing aminoplast crosslinkers may contain an acid catalyst such as dodecylbenzene-sulfonic acid or its amine salts, p-toluenesulfonic acid or its amine salts, or monoalkyl phosphate. Systems containing blocked polyisocyanate crosslinkers may contain a tin catalyst such as dibutyltin oxide.

The coating composition may be prepared using conventional dispersers or mills such as sand grinding mills, ball mills or various types of blenders. The coating composition may be applied using conventional methods such as roller coating, curtain-flow coating, airless spray coating or electrostatic coating on sheet metals such as cold rolled steel sheets, galvanized steel sheets, aluminum-zinc plated steel sheets, stainless steel sheets, tinplate steel sheets and aluminum sheets. When highter corrosion resistance is desired, a primer coating may be applied before the application of the coating composition and baked separately. The baking temperature and time may be suitably selected depending upon the size or thickness of substrate to be coated and also the curability of particular coating compositions.

Precoated sheet metals thus produced find a variety of uses, for example, for electrical appliances such as audio instruments, refrigerators, washers and room heaters, indoor construction materials such as partitions and curtain rails, and outdoor construction materials such as embossed sheet metals and the like.

The invention is further illustrated by the following examples wherein all parts and % are by weight unless otherwise indicated.

SYNTHESIS OF POLYESTER RESINS

A reactor vessel was charged with 4.0 moles of terephthalic acid, 4.0 moles of isophthalic acid, 2.0 moles of adipic acid, 5.0 moles of bisphenol S-ethylene oxide (2 moles) adduct (BSE-20, Sanyo Chemical Industries, Ltd.), 4.0 moles of 1, 6-hexanediol, 6.0 moles of ethylene glycol, and 0.05% based on the total reactants of dibutyltin oxide. The mixture was allowed to react by raising the temperature from 150° C. to 220° C. over 4 hours. Thereafter, the reaction was continued until a reduced pressure of 1 mmHg was reached over 1 hour and then at a reduced pressure of 0.3 mmHg at 260° C. for additional 3 hours to give polyester #1 shown in Table 1.

Analogous to the above procedure, polyesters #2 through #15 (Examples), #16 through #25 (Comparative Examples), #26 through #32 (Examples) and #33 through #38 (Comparative Examples) shown in Table 1, Table 2, Table 3 and Table 4, respectively were produced.

TABLE 1

| Reactant, mole | Polyester resin | | | | | | | | | | | | | | |
|---|---|---|---|---|---|---|---|---|---|---|---|---|---|---|---|
| | #1 | #2 | #3 | #4 | #5 | #6 | #7 | #8 | #9 | #10 | #11 | #12 | #13 | #14 | #15 |
| Terephthalic acid | 40 | 40 | 40 | 40 | 20 | 40 | 40 | 40 | 25 | 25 | 25 | 10 | 10 | 10 | 40 |
| Isophthalic acid | 40 | 40 | 40 | 40 | — | 40 | 40 | 40 | 25 | 25 | 25 | 10 | 10 | 10 | 40 |
| Phthalic acid | — | — | — | — | 60 | — | — | — | — | — | — | — | — | — | — |
| Adipic acid | 20 | 20 | — | — | 20 | 20 | 20 | 20 | 25 | 25 | 25 | 80 | 80 | 80 | 20 |
| 1,4-Cyclohexane-dicarboxylic acid | — | — | 20 | 20 | — | — | — | — | 25 | 25 | 25 | — | — | — | — |
| BSE-20[1] | 50 | — | 50 | 50 | 50 | 30 | 80 | 50 | 80 | 50 | 30 | 80 | 50 | 30 | 98 |
| BSE-40[2] | — | 50 | — | — | — | — | — | — | — | — | — | — | — | — | — |
| Ethylene glycol | 10 | 10 | 10 | 10 | 10 | 10 | 10 | 10 | 10 | 10 | 10 | 10 | 10 | 10 | 2 |
| 1,6-Hexanediol | 40 | 40 | 40 | 20 | 40 | 50 | 10 | 30 | 10 | 20 | 20 | 10 | 10 | 10 | — |
| 1,4-Cyclohexane-dimethanol | — | — | — | 20 | — | 10 | — | — | — | 20 | 40 | — | 30 | 50 | — |
| Neopentyl glycol | — | — | — | — | — | — | — | 10 | — | — | — | — | — | — | — |
| Mn ($\times 10^4$) | 2.1 | 2.0 | 2.0 | 2.2 | 2.1 | 2.1 | 2.3 | 1.9 | 2.0 | 1.9 | 2.2 | 2.1 | 2.1 | 2.3 | 1.8 |

[1] Bisphenol S-ethylene oxide (2 moles) adduct
[2] Bisphenol S-ethylene oxide (4 moles) adduct

TABLE 2

| Reactant, mole | Polyester resin | | | | | | | | | |
|---|---|---|---|---|---|---|---|---|---|---|
| | #16 | #17 | #18 | #19 | #20 | #21 | #22 | #23 | #24 | #25 |
| Terephthalic acid | 50 | 50 | 50 | 50 | 40 | 25 | 10 | 40 | 40 | 25 |
| Isophthalic acid | 50 | 50 | 50 | 50 | 40 | 25 | 10 | 40 | 40 | 25 |
| Phthalic acid | — | — | — | — | — | — | — | — | — | — |
| Adipic acid | — | — | — | — | 20 | 20 | 20 | 20 | 20 | 20 |

TABLE 2-continued

| Reactant, mole | Polyester resin | | | | | | | | | |
|---|---|---|---|---|---|---|---|---|---|---|
| | #16 | #17 | #18 | #19 | #20 | #21 | #22 | #23 | #24 | #25 |
| 1,4-Cyclohexane-dicarboxylic acid | — | — | — | — | — | 30 | 60 | — | — | 30 |
| BSE-20 | 80 | 50 | 30 | 10 | 10 | 10 | 10 | 50 | — | — |
| BSE-40 | — | — | — | — | — | — | — | — | — | — |
| Ethylene glycol | 10 | 10 | 10 | 10 | 10 | 10 | 10 | 10 | 10 | 10 |
| 1,6-Hexanediol | 10 | 40 | 60 | 50 | 40 | 40 | 30 | — | 45 | — |
| 1,4-Cyclohexane-dimethanol | — | — | — | 30 | 40 | 40 | 50 | — | 45 | 90 |
| Neopentyl glycol | — | — | — | — | — | — | — | 40 | — | — |
| Mn (× 10⁴) | 2.0 | 1.9 | 2.1 | 2.1 | 2.0 | 2.1 | 2.1 | 1.9 | 2.1 | 2.0 |

TABLE 3

| Reactant, mole | Polyester resin | | | | | | |
|---|---|---|---|---|---|---|---|
| | #26 | #27 | #28 | #29 | #30 | #31 | #32 |
| Terephthalic acid | 42 | 42 | 42 | 35 | 35 | 35 | 35 |
| Isophthalic acid | 42 | 42 | 42 | 35 | 35 | 35 | 35 |
| Phthalic acid | — | — | — | — | — | — | — |
| Adipic acid | 8 | 8 | 8 | 15 | 15 | — | 15 |
| 1,4-Cyclohexane- | 8 | 8 | 8 | 15 | 15 | 30 | 15 |
| BSE-20 | 80 | 50 | — | 80 | 50 | 80 | 50 |
| BSE-40 | — | — | 50 | — | — | — | — |
| Ethylene glycol | 10 | 10 | 10 | 10 | 10 | 10 | 10 |
| 1,6-Hexanediol | 10 | 40 | 40 | 10 | 40 | 10 | — |
| 1,4-Cyclohexane-dimethanol | — | — | — | — | — | — | 30 |
| Mn (× 10⁴) | 2.1 | 2.0 | 1.9 | 2.2 | 1.8 | 2.0 | 2.2 |

TABLE 4

| Reactant, mole | Polyester resin | | | | | |
|---|---|---|---|---|---|---|
| | #33 | #34 | #35 | #36 | #37 | #38 |
| Terephthalic acid | 50 | 50 | 20 | 42 | 25 | 25 |
| Isophthalic acid | 50 | 50 | — | 42 | 25 | 25 |
| Phthalic acid | — | — | 60 | — | — | — |
| Adipic acid | — | — | 20 | 8 | 25 | 25 |
| 1,4-Cyclohexane-dicarboxylic acid | — | — | — | 8 | 25 | 25 |
| BSE-20 | 80 | 50 | 50 | 10 | 80 | 50 |
| BSE-40 | — | — | — | — | — | — |
| Ethylene glycol | 10 | 10 | 10 | 10 | 10 | 10 |
| 1,6-Hexanediol | 10 | 40 | 40 | 40 | 10 | 20 |
| 1,4-Cyclohexane-dimethanol | — | — | — | 40 | — | 20 |
| Mn (× 10⁴) | 2.0 | 2.2 | 2.0 | 1.9 | 2.1 | 1.8 |

EXAMPLES 1-15 AND COMPARATIVE EXAMPLES 1-10

Polyester resins #1 through #25 were each dissolved in cyclohexanone to 40% concentration. 200 parts of each solution, 25 parts of Sumimal M40S (methylated melamine resin sold by Sumitomo Chemical Company, Limited, 80% nonvolatile content), 100 parts of Taipek CR-97 (titanium dioxide pigment sold by Ishihara Sango Kaisha, Ltd.), 1 part of Catalyst 6000 (dodeyl-benzensulfonic acid solution sold by Mitsui Toatsu Chemicals, Inc.) and 115 parts of 1:1 mixture of cyclohexanone/Solvesso 150 were taken in a container and throughly mixed. The mixture was transferred to a paint shaker and dispersed for 1 hour.

Each coating composition was applied on a zinc phosphate-treated galvanized steel plate having a thickness of 0.5 mm to a dry film thickness of 16 micron using a roll coater and then baked at 250° C. for one minute. Performance of the coated steel sheet is shown in Table 5 and Table 6.

EXAMPLES 16-30 AND COMPARATIVE EXAMPLES 11-20

Polyester resins #1 through #25 were each dissolved in cyclohexanone to 40% concentration. 200 parts of each solution, 12.5 parts of Sumimal M40S, 12.5 parts of Coronate 2515 (blocked polyisocyanate sold by Nippon Polyurethane Co., Ltd., 80% nonvolatile content), 12.5 parts of Taipek CR-97, 1 part of Catalyst 6000 and 115 parts of a 1:1 mixture of cyclohexanone/Solvesso 150 were taken in a container and thoroughly mixed. The mixture was transferred to a paint shaker and dispersed for 1 hour.

Each coating composition was applied on a zinc phosphate-treated galvanized steel sheet having a thickness of 0.5 mm to a dry film thickness of 16 micron using a roll coater and then baked at 250° C. for one minute. Performance of the coated steel sheet is shown in Table 7 and Table 8.

EXAMPLES 31-45 AND COMPARATIVE EXAMPLES 21-30

Polyester resins #1 through #25 were each dissolved in cyclohexanone to 40% concentration. 200 parts of each solution, 25 parts of Coronate 2515, 100 parts of Taipek CR-97 and 115 parts of a 1:1 mixture of cyclohexanone/Solvesso 150 were taken in a container and thoroughly mixed. The mixture was transferred to a paint shaker and dispersed for 1 hour.

Each coating composition was applied on a zinc phosphate-treated galvanized steel sheet having a thickness of 0.5 mm to a dry film thickness of 16 micron using a roll coater and then baked at 250° C. for one minute. Performance of the coated steel is shown in Table 9 and Table 10.

EVALUATION METHODS

Hardness (pencil hardness)

Using a standard pencil according to JIS S-6006, a method according to JIS K-5400 was performed with coating films formed on the substrate sheets.

Flexibility

The coated steel sheet was bent at 5° C. in U-shape through 180° C. over a number of interposed steel sheets having a thickness of 0.5 mm which were stacked together and the occurrence of cracks in the bent area was visually observed. Flexibility is expressed in terms of the minimum number of stacked sheets at which no crack is observed. The symbol "2T", for example, stands for two sheets. The smaller the number the better the product.

Blot-proofness

The coated substrate was blotted with an oily ink(red) in the area of 0.5 cm × 2 cm and dried at 24° C. for 24 hours. Then the blot area was wiped with gauze impregnated with ethanol. Blot-proofness was judged in terms of the degree of remaining blot according to the following scale:

O: Good; Δ: Slightly bad; x: Bad

Gloss

Percent reflection at an angle of 60° C. was determined using a standard glossmeter.

TABLE 5

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Polyester resin | #1 | #2 | #3 | #4 | #5 | #6 | #7 | #8 | #9 | #10 | #11 | #12 | #13 | #14 | #15 |
| Pencil hardness | 2H | 2H | 2H | 2H-3H | H-2H | H-2H | 3H | 2H | 3H | 2H | 2H | H | H | H | 3H |
| Flexibility | 1T | 1T | 1T | 2T | 2T | 2T | 2T | 1T | 2T | 1T | 1T | 1T | 1T | 1T | 2T |
| Blot-proofness | O | O | O | O | O | O | O | O | O | O | O | O | O | O | O |
| Gloss | 95 | 93 | 96 | 93 | 105 | 92 | 98 | 94 | 99 | 94 | 90 | 98 | 93 | 91 | 103 |

TABLE 6

| | Comparative Example | | | | | | | | | |
|---|---|---|---|---|---|---|---|---|---|---|
| | 1 | 2 | 3 | 4 | 5 | 6 | 7 | 8 | 9 | 10 |
| Polyester resin | #16 | #17 | #18 | #19 | #20 | #21 | #22 | #23 | #24 | #25 |
| Pencil hardness | 3H | 2H | H-2H | H-2H | H-2H | H | H | 2H | H | H |
| Flexibility | 5T | 4T | 4T | 4T | 3T | 3T | 3T | 5T | 3T | 3T |
| Blot-proofness | O | O | O | Δ | X | X | X | O | X | X |
| Gloss | 94 | 92 | 89 | 84 | 83 | 85 | 81 | 92 | 82 | 84 |

TABLE 7

| | Example | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Polyester resin | #1 | #2 | #3 | #4 | #5 | #6 | #7 | #8 | #9 | #10 | #11 | #12 | #13 | #14 | #15 |
| Pencil hardness | 2H | 2H | 2H | 2H-3H | H-2H | H-2H | 3H | 2H | 3H | 2H | 2H | H | H | H | 3H |
| Flexibility | 0T | 0T | 0T | 1T | 1T | 1T | 1T | 0T | 1T | 0T | 0T | 0T | 0T | 0T | 1T |
| Blot-proofness | O | O | O | O | O | O | O | O | O | O | O | O | O | O | O |
| Gloss | 97 | 94 | 94 | 93 | 102 | 93 | 97 | 94 | 101 | 95 | 91 | 96 | 95 | 90 | 100 |

TABLE 8

| | Comparative Example | | | | | | | | | |
|---|---|---|---|---|---|---|---|---|---|---|
| | 11 | 12 | 13 | 14 | 15 | 16 | 17 | 18 | 19 | 20 |
| Polyester resin | #16 | #17 | #18 | #19 | #20 | #21 | #22 | #23 | #24 | #25 |
| Pencil hardness | 3H | 2H | H-2H | H-2H | H-2H | H | H | 2H | H | H |
| Flexibility | 4T | 3T | 3T | 3T | 2T | 2T | 2T | 4T | 2T | 2T |
| Blot-proofness | O | O | O | Δ | X | X | X | O | X | X |
| Gloss | 93 | 93 | 90 | 85 | 82 | 85 | 81 | 93 | 82 | 83 |

TABLE 9

| | Example | | | | | | | | | | | | | | |
|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 |
| Polyester resin | #1 | #2 | #3 | #4 | #5 | #6 | #7 | #8 | #9 | #10 | #11 | #12 | #13 | #14 | #15 |
| Pencil hardness | H | H | H | H-2H | F-H | F-H | 2H | H | 2H | H | H | F | F | F | 2H |
| Flexibility | 0T | 0T | 0T | 1T | 1T | 1T | 1T | 0T | 1T | 0T | 0T | 0T | 0T | 0T | 1T |
| Blot-proofness | O | O | O | O | O | O | O | O | O | O | O | O | O | O | O |
| Gloss | 96 | 93 | 95 | 95 | 102 | 94 | 97 | 94 | 97 | 94 | 91 | 96 | 94 | 92 | 104 |

TABLE 10

| | Comparative Example | | | | | | | | | |
|---|---|---|---|---|---|---|---|---|---|---|
| | 21 | 22 | 23 | 24 | 25 | 26 | 27 | 28 | 29 | 30 |
| Polyester resin | #16 | #17 | #18 | #19 | #20 | #21 | #22 | #23 | #24 | #25 |
| Pencil hardness | 2H | H | F-H | F-H | F-H | F | F | H | F | F |
| Flexibility | 4T | 3T | 3T | 3T | 2T | 2T | 2T | 4T | 2T | 2T |
| Blot-proofness | O | O | O | Δ | X | X | X | O | X | X |
| Gloss | 93 | 92 | 90 | 83 | 83 | 86 | 81 | 90 | 83 | 83 |

EXAMPLES 46-52 AND COMPARATIVE EXAMPLES 31-36

Polyeter resins #26 through #38 were each dissolved in cyclohexanone to 40% concentration. 200 parts of each solution, 25 parts of Sumimal M40S, 100 parts of Taipek CR-97, 1 part of Catalyst 6000, and 115 parts of a 1:1 mixture of cyclohexanone/Solvesso 150 were placed in a container and thoroughly mixed. The mixture was transferred to a paint shaker and dispersed for 1 hour.

Each coating composition was applied on a zinc phosphate-treated galvanized steel sheet having a thickness of 0.5 mm to a dry thickness of 16 micron using a roll coater and then baked at 250° C. for one minute. Performance of the coated steel is shown in Table 11 and Table 12.

EXAMPLES 53-59 AND COMPARATIVE EXAMPLES 37-42

Polyester resins #26 through #38 were each dissolved in cyclohexanone to 40% concentration. 200 parts of each solution, 12.5 parts of Sumimal M40S, 12.5 parts of Coronate 2515, 100 parts of Taipek CR-97, 1 part of Catalyst 6000, and 115 parts of a 1:1 mixture of cyclohexanone/Solvesso 150 were taken in a container and thoroughly mixed. The mixture was transferred to a paint shaker and dispersed for 1 hour.

Each coating composition was applied on a zinc phosphate-treated galvanized steel sheet having a thickness of 0.5 mm to a dry film thickness of 16 micron using a roll coater and then baked at 250° C. for one minute. Performance of the coated sheet is shown in Table 13 and Table 14.

EXAMPLES 60-66 AND COMPARATIVE EXAMPLES 43-48

Polyester resins #26 through #38 were each dissolved in cyclohexanone to 40% concentration. 200 parts of each solution, 25 parts of Coronate 2515, 100 parts of Taipek CR-97, and 115 parts of a 1:1 mixture of cyclohexanone/Solvesso 150 were taken in a container and thoroughly mixed. The mixture was transferred to a paint shaker and dispersed for 1 hour.

Each coating composition was applied on a zinc phosphate-treated galvanized steel sheet having a thickness of 0.5 mm to a dry film thickness of 16 micron using a roll coater and then baked at 250° C. for one minute. Performance of the coated sheet is shown in Table 15 and 16.

EVALUATION METHODS

Pencil hardness and flexibity were evaluated as in preceding examples. Anti-chemical and anti-press impression properties were eveluated by the following methods.

Anti-chemical property

One drop (0.2 cc) of 0.1N sulfuric acid was placed on the coated surface and allowed to stand at 60° C. for one hour. After washing with water, the specimen was visually evaluated for the presence of a trace mark of sulfuric acid according to the following schedule:

O: No trace; Δ: Slight trace; x: Marked trace

Anti-press impression property

A section of refrigerator door gasket (1×2 cm) was pressed against the coated surface at a pressure of 100 g loading and maintained at 70° C. for 168 hours. The specimen was visually evaluated for the presence of an impression according to the following schedule:

O: No impression; Δ: Slight impression; x: Marked impression

TABLE 11

| | Example | | | | | | |
|---|---|---|---|---|---|---|---|
| | 46 | 47 | 48 | 49 | 50 | 51 | 52 |
| Polyester resin | #26 | #27 | #28 | #29 | #30 | #31 | #32 |
| Pencil hardness | 3H | 2H | 2H | 3H | 2H | 3H | 2H |
| Flexibility | 2T | 1T | 1T | 2T | 1T | 2T | 1T |
| Anti-chemical property | O | O | O | O | O | O | O |
| Anti-impression property | O | O | O | O | O | O | O |

TABLE 12

| | Comparative Example | | | | | |
|---|---|---|---|---|---|---|
| | 31 | 32 | 33 | 34 | 35 | 36 |
| Polyester resin | #33 | #34 | #35 | #36 | #37 | #38 |
| Pencil hardness | 3H | 2H | H-2H | H-2H | 3H | 2H |
| Flexibility | 5T | 4T | 2T | 3T | 2T | 1T |
| Anti-chemical property | O | O | Δ | X | Δ | X |
| Anti-impression property | O | O | Δ | X | Δ | Δ |

TABLE 13

| | Example | | | | | | |
|---|---|---|---|---|---|---|---|
| | 53 | 54 | 55 | 56 | 57 | 58 | 59 |
| Polyester resin | #26 | #27 | #28 | #29 | #30 | #31 | #32 |
| Pencil hardness | 3H | 2H | 2H | 3H | 2H | 3H | 2H |
| Flexibility | 1T | 0T | 0T | 1T | 0T | 1T | 0T |
| Anti-chemical property | O | O | O | O | O | O | O |
| Anti-impression property | O | O | O | O | O | O | O |

TABLE 14

| | Comparative Example | | | | | |
|---|---|---|---|---|---|---|
| | 37 | 38 | 39 | 40 | 41 | 42 |
| Polyester resin | #33 | #34 | #35 | #36 | #37 | #38 |
| Pencil hardness | 3H | 2H | H-2H | H-2H | 3H | 2H |
| Flexibility | 4T | 3T | 1T | 2T | 1T | 0T |
| Anti-chemical property | O | O | Δ | X | Δ | X |
| Anti-impression property | O | O | Δ | X | Δ | Δ |

TABLE 15

| | Example | | | | | | |
|---|---|---|---|---|---|---|---|
| | 60 | 61 | 62 | 63 | 64 | 65 | 66 |
| Polyester resin | #26 | #27 | #28 | #29 | #30 | #31 | #32 |
| Pencil hardness | 2H | H | H | 2H | H | 2H | H |
| Flexibility | 1T | 0T | 0T | 1T | 0T | 1T | 0T |
| Anti-chemical property | O | O | O | O | O | O | O |
| Anti-impression property | O | O | O | O | O | O | O |

TABLE 16

| | Comparative Example | | | | | |
|---|---|---|---|---|---|---|
| | 43 | 44 | 45 | 46 | 47 | 48 |
| Polyester resin | #33 | #34 | #35 | #36 | #37 | #38 |
| Pencil hardness | 2H | H | F-H | F-H | 2H | H |
| Flexibility | 4T | 3T | 1T | 2T | 1T | 0T |
| Anti-chemical property | O | O | Δ | X | Δ | X |
| Anti-impression property | O | O | Δ | X | Δ | Δ |

We claim:

1. A polyester coating composition comprising:

(A) 50 to 95 parts by weight as solids of a polyester resin produced by reacting a polybasic acid component consisting essentially of 20 to 80 mole % of the total acid component of an aromatic dicarboxylic acid and the balance of an aliphatic and/or alicyclic dicarboxylic acid, and a polyhydric alcohol component consisting essentially of 50 to 98 mole % of the total alcohol component of a bisphenol S-alkylene oxide adduct of the formula:

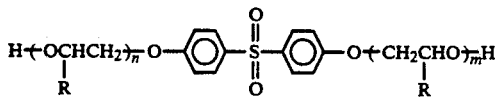

wherein R is H or methyl, n and m are each an integer from 1 to 8, 0 to 10 mole % of the total alcohol component of a branched chain-aliphatic glycol; and the balance of a straight chain-aliphatic and/or alicyclic diol;

(B) 50 to 5 parts by weight as solids of an aminoplast resin and/or a blocked polyisocyanate.

2. The polyester coating composition according to claim 1, wherein said polyester has a molecular weight from 2,000 to 25,000.

3. The polyester coating composition according to claim 1, wherein said aminoplast resin is a melamine resin.

4. The polyester coating composition of claim 1, wherein said blocked polyisocyanate is a non-yellowing blocked polyisocyanate.

5. A precoated steel sheet having thereon a cured coating film of the composition of claim 1.

6. The polyester coating composition according to claim 1, wherein said aromatic dicarboxylic acid component is a mixture of terephthalic acid with isophatic acid or phthalic acid.

7. The polyester coating composition according to claim 1, wherein said aliphatic and/or alicyclic dicarboxylic acid component is adipic acid, 1,4-cyclohexanedicarboxylic acid or a mixture thereof.

8. The polyester coating composition according to claim 1, wherein said bisphenol S-alkylene oxide adduct is bisphenol S-ethylene oxide (2 moles) adduct or bisphenol S-ethylene oxide (4 moles) adduct.

9. The polyester coating composition according to claim 1, wherein said branched-chain aliphatic glycol is neopentyl glycol.

10. The polyester coating composition according to claim 1, wherein said straight-chain aliphatic and/or alicyclic diol component is ethylene glycol, 1,6-hexanediol, 1,4-cyclohexanedimethanol; or a mixture thereof.

11. The polyester coating composition according to claim 1, wherein said aromatic dicarboxylic acid component is a mixture of terephthalic acid with isophatic acid or phthalic acid; wherein said aliphatic and/or alicyclic dicarboxylic acid component is adipic acid, 1,4-cyclohexanedicarboxylic acid or a mixture thereof; wherein said bisphenol S-alkylene oxide adduct is bisphenol S-ethylene oxide (2 moles) adduct or bisphenol S-ethylene oxide (4 moles) adduct; wherein said branched-chain aliphatic glycol is neopentyl glycol; and wherein said straight-chain aliphatic and/or alicyclic diol component is ethylene glycol, 1,6-hexanediol, 1,4-cyclohexanedimethanol; or a mixture thereof.

12. A precoated steel sheet having thereon a cured coating film of the composition of claim 2.

13. A precoated steel sheet having thereon a cured coating film of the composition of claim 3.

14. A precoated steel sheet having thereon a cured coating film of the composition of claim 4.

15. A precoated steel sheet having thereon a cured coating film of the composition of claim 6.

16. A precoated steel sheet having thereon a cured coating film of the composition of claim 7.

17. A precoated steel sheet having thereon a cured coating film of the composition of claim 8.

18. A precoated steel sheet having thereon a cured coating film of the composition of claim 9.

19. A precoated steel sheet having thereon a cured coating film of the composition of claim 10.

* * * * *